United States Patent [19]

Morsbach et al.

[11] 4,373,735

[45] Feb. 15, 1983

[54] SOFT MATERIAL SEALING DISC USED AS HEAD GASKET

[75] Inventors: Martin Morsbach; Friedhelm Stecher, both of Burscheid; Eberhard Stöcker, Herdorf, all of Fed. Rep. of Germany

[73] Assignee: Goetze AG, Burscheid, Fed. Rep. of Germany

[21] Appl. No.: 76,210

[22] Filed: Sep. 17, 1979

[30] Foreign Application Priority Data

Sep. 15, 1978 [DE] Fed. Rep. of Germany ....... 2840154

[51] Int. Cl.³ .............................................. F16J 15/12
[52] U.S. Cl. ......................... 277/235 B; 277/DIG. 6; 427/290
[58] Field of Search ........... 277/235 R, 235 A, 235 B, 277/DIG. 6; 427/290, 292, 299, 444

[56] References Cited

U.S. PATENT DOCUMENTS

| 2,139,314 | 12/1938 | Oglesby | 427/290 |
| 3,136,649 | 6/1964 | Keahey | 427/290 |
| 3,228,786 | 1/1966 | Fitzgerald et al. | 427/290 |
| 3,970,322 | 7/1976 | Stecher et al. | 277/235 B |
| 4,201,804 | 5/1980 | Stecher et al. | 277/235 B X |

FOREIGN PATENT DOCUMENTS

| 1072032 | 12/1959 | Fed. Rep. of Germany . | |
| 2304558 | 4/1976 | Fed. Rep. of Germany . | |
| 2053829 | 4/1971 | France | 277/235 B |
| 2103961 | 4/1972 | France | 277/235 B |
| 1199339 | 7/1970 | United Kingdom | 277/235 B |
| 1447143 | 8/1976 | United Kingdom . | |

Primary Examiner—Robert S. Ward, Jr.
Attorney, Agent, or Firm—Spencer & Kaye

[57] ABSTRACT

A porous soft material sealing gasket comprising an asbestos fiber web with a multiplicity of perforations. The perforated web is impregnated with an impregnating agent that at least partially fills the free pores of the web by penetrating through the perforations.

13 Claims, 2 Drawing Figures

SOFT MATERIAL SEALING DISC USED AS HEAD GASKET

BACKGROUND OF THE INVENTION

The present invention relates to a porous soft material sealing gasket, in particular, a cylinder head gasket for internal combustion engines, comprising an asbestos fiber plate, which may be metallically reinforced, impregnated with agents which wholly or partially fill the free pores of the soft material. Such impregnating agents are preferably plastic in the final state and/or are elastically cross-linked.

Cylinder head gaskets are used as static seals and are clamped or bolted between the cylinder head and motor block of an internal combustion engine to seal the rigid, generally flat faces of these engine parts. Cylinder head gaskets serve the purpose of providing a satisfactory surface seal quality by compensating for the unevenness and roughnesses of the surfaces to be sealed. For this reason, they are made of material which are plastically or elastically deformable under pressure, and are often made of a fibrous material, such as, in particular, of a soft asbestos fiber layer in the form of a plate or disc, which is possibly provided with reinforcing metallic inserts or metal sheets. The starting material for such cylinder head gaskets generally is an asbestos fiber mass mixed with binders, such as natural or synthetic rubber in small quantities, which is formed into a generally flat fiber web sheet or layer which can then be stamped and cut into the desired shape of the gasket.

Soft material cylinder head gaskets for internal-combustion engines usually comprise a laminate of a sheet metal plate onto which plates of asbestos fiber webs are rolled on both sides of the metal plate. This results in metallic reinforcement of the fiber web. For optimum seal strength, good adhesion between the layers is necessary, and this is accomplished by providing the sheet metal plate with rough cut teeth on both sides at regular intervals. During rolling, these teeth anchor the asbestos fiber plates by pressing themselves into the soft material in such a manner that normally, their tips penetrate to the surface of the gasket.

Cylinder head gaskets generally contain passages which have been cut out for the combustion chamber, the coolant and the lubricant. In the region of these passages, the sealing edges must be particularly tight against the hot gases of the combustion chamber which gases are under high pressure, against the lubricant and against the coolant which might contain anti-freeze. A simple gasket made of asbestos fiber, binder and possibly embedded reinforcing metal plates is not sufficient for this purpose because the cross-sectional density of the porous asbestos fiber material is unsatisfactory and the media to be sealed can pass through the seal. An additional improvement in the density of the asbestos material is required.

In the past, in order to provide a better surface seal, the edges of the passages have been provided with a metal bordering casing or flange, usually of copper or iron. In addition, the cross-sectional density and cross-sectional sealing capability of the asbestos fiber layer has been improved by utilizing impregnating or saturating agents and thereafter vulcanizing and hardening the impregnating agent. The impregnating or saturating agents that have been used include solutions, dispersions, emulsions or latexes of polymerized or polymerizable substances.

For an impregnation such as the one described in German Auslegeschrift No. 2,304,558 corresponding to British Pat. No. 1,447,143, and corresponding to U.S. application Ser. No. 918,820, now U.S. Pat. No. 4,201,804 which is preferably done by immersion, an additional advantage of the use of the metal plates with rough cut teeth is that the impregnating agent can penetrate deeply into the asbestos fibers through the openings produced by the penetration of the rough teeth. Particularly in an impregnation in which the pores are only partially filled, the impregnating agent is thus more uniformly distributed into all pores over the entire cross section.

For optimum results, an impregnation performed in this manner requires that the rough metal teeth be produced with great precision so that they have a uniform configuration, particularly with respect to their tips. Such precise manufacture is, however, difficult to attain in practice and costly due to irregular wear of the cutting tools. Thus, the impregnation will not be of the desired quality at those points where, due to a smaller angle of inclination, the rough metal teeth have not completely penetrated the asbestos fiber layer. The resulting cylinder head gaskets have deformation characteristics and sealing qualities which differ from place to place and which do not match the machine parts to be sealed.

Moreover, the proper impregnation of porous soft material sealing plates without embedded rough metal teeth could prove even more difficult. Depending on the viscosity of the impregnating (saturation) agent, the plate thickness and the immersion time, the impregnating agent will penetrate the soft material to different depths and, accordingly, the resultant coating has different depths. Such gaskets might not then have optimum deformation characteristics and crosssectional sealing properties.

SUMMARY OF THE INVENTION

It is an object of the present invention to provide soft material sealing gaskets which are impregnated with a desired distribution of impregnating agent without incurring any special expense.

It is a further object of the present invention to provide a method for impregnating cylinder head gaskets in internal combustion engines, which comprise asbestos fiber plates with rough teeth metal discs embedded therein for reinforcement.

To achieve the foregoing objects, and in accordance with its purpose, the present invention provides a porous soft material sealing gasket comprising a soft material in the form of an asbestos fiber web having a sealing face and an impregnating agent, the asbestos fiber web containing free pores and a multiplicity of perforations in its unimpregnated form, and the impregnating agent filling at least a part of the free pores of the web by penetrating through the perforations during impregnation.

In another aspect, the present invention provides a method for producing a porous, soft material sealing gasket comprising providing an asbestos fiber web with a multiplicity of perforations, and impregnating the perforated web with an impregnating agent to fill the free pores of the perforated web at least in part with the impregnating agent by having the impregnating agent penetrate through the perforations into the free pores.

It is to be understood that both the foregoing general description and the following detailed description are exemplary, but are not restrictive of the invention.

DETAILED DESCRIPTION OF THE INVENTION

Figure 1:
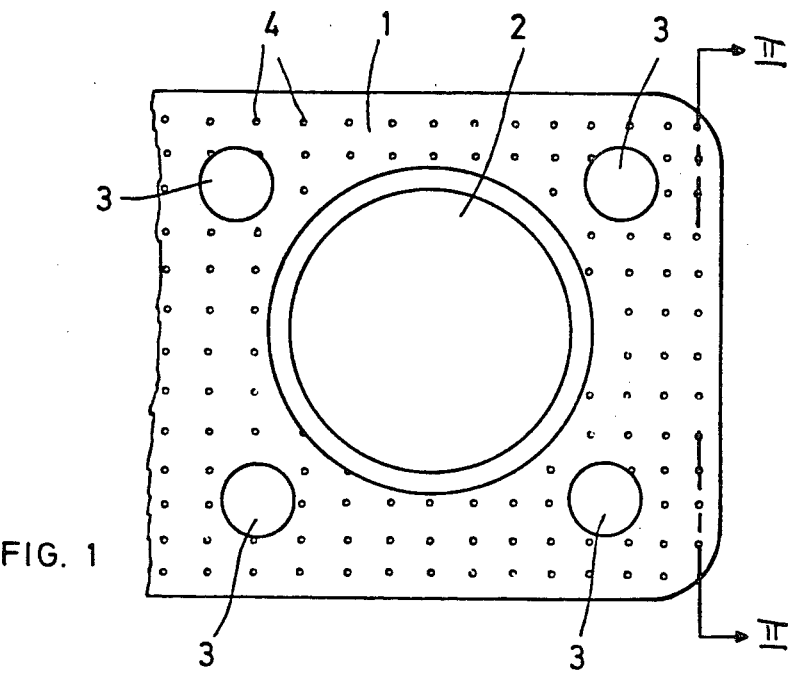
FIG. 1 is a top view of a part of a cylinder head gasket made in accordance with the present invention.

The porous, soft material seals of the present invention are made of a thermally stable soft material comprised of a fiber fleece or web of asbestos. The soft material is cut out in the specific shape required for the particular application in which it is to be used, such as a cylinder head gasket for an internal combustion engine, and generally is in the shape of a sheet having various passages for the combustion chambers, coolant and lubricant.

The gasket can comprise a single sheet of soft material, or two external soft material sheets having a metal reinforcement, such as a metal plate therebetween, or a soft material sheet which is covered on one side with a metal plate. Further, the edges of a seal used as a gasket adjacent combustion chamber passages can contain a metal casing or bordering flange having an approximately U-shaped cross section to protect these edges with the arms of the U lying on the opposing lateral planar surfaces of the gasket and the base of the U lying against the cylindrical surface of the passage. A bordering casing for coolant, lubricant and other passages can also be provided and generally comprises metal discs which lie on the lateral planar surfaces of the gasket to protect the planar surfaces of the gasket, while the cylindrical surface of these passages are not protected by a casing.

According to the present invention, the flat, soft material fiber webs are provided with a multiplicity of holes prior to impregnation. Preferably, these perforations are distributed at uniform intervals over the surface of the fiber webs and completely penetrate the soft material, that is, they pass through the entire thickness of the soft material. These perforations can be produced particularly easily with appropriate perforation rollers and, for the purposes of the invention, the perforations can be made in the fiber webs either before or after combining the layers into a laminate or can be made in the already completely cut and/or flanged cylinder head gaskets. Preferably, however, the perforations are made with perforation rolls after the asbestos fiber webs are united with the rough metal on a calender, the perforation rolls being connected downstream of the calender. In this way, the possible closing of perforations by subsequent rolling is prevented.

In a preferred embodiment of the invention, approximately 3 to 15 perforations are distributed on each square centimeter of the sealing face of the gasket on both sides of the gasket, so as to penetrate the asbestos fiber web perpendicular to the sealing face of the gasket. When the gasket comprises two fibrous webs each having a sealing face, 3 to 15 perforations are distributed on each square centimeter of each sealing face so as to penetrate the fiber webs perpendicularly to the sealing faces. The perforation diameter of the perforation is between about 0.01 and about 0.1 mm. It is advantageous if the perforation density and perforation size are varied in correspondence with the thickness of the gasket so that as the thickness of the gasket increases, the perforation density and the perforation size are increased toward the upper limit.

After the gasket has been formed into its desired shape and has been perforated according to the process of the invention, it is impregnated with an agent that is preferably plastic in its final state and/or is elastically crosslinked. These materials include solutions, dispersion, emulsions or latexes of polymerized or polymerizable substances, such as polyvinyl chloride, polytetrafluoroethylene, polycarbonate and copolymers of butadiene and acrylonitrile. Impregnation with these materials is described, for example, in German Pat. No. 1,072,032.

Impregnation may also be performed, as described in German Auslegeschrift No. 2,304,558, and copending U.S. Patent Application Ser. No. 438,356 now U.S. Pat. No. 3,970,322, with organic, synthetic, completely polymerizable liquids which do not contain any volatile materials. Examples of polymerizable liquid impregnating agents that can be employed in the practice of the present invention include polybutadiene, polymethacrylate, polycrotonaldehyde, systems of isocyanates with alcohols or amines, systems of epoxides and alcohols and amines and systems of acroylchloride and esters of acrylic acid.

These polymerizable liquids are well known and can be polymerized in accordance with conventional methods. Depending on the particular liquid, polymerization can occur through the use of free radical initiation with compounds such as organic peroxides, through the use of compounds such as sulfur which is a well known curing and vulcanizing agent or by thermal means.

Liquids polymerizable by sulfur include polybutadiene and liquid styrolbutadiene-rubbers. These liquids can be polymerized by conventional techniques such as heating a mixture of the liquid and sulfur at temperatures of from about 120° to 190° C. for 2 to 30 minutes.

Liquids polymerizable by organic peroxides such as benzoyl peroxide include methacrylates, crotonaldehyde and esters of acrylic acid. These liquids can be polymerized by conventional methods well known in the art as by heating a mixture of the liquid and peroxide at temperatures of from about 125° to 200° C. for 2 to 30 minutes.

Thermally polymerizable liquids that can be used in the practice of the present invention are those liquids that can be polymerized solely by heat and include systems of epoxides with amines or alcohols, systems of isocyanates with amines or alcohols. Generally, these liquids are heated at a temperature between 40° and 200° C. for about 5 minutes to 10 hours.

The polymerizable liquids used as impregnating agents in the present invention preferably have a low viscosity of 200 to 1,500 centipoises at a temperature of 20° C., and when completely polymerized have a molecular weight in the range between 3,000 and 80,000.

The impregnation of the gasket with the polymerizable impregnating agent preferably can be performed by immersing the gasket in the impregnating agent for a period of time, such a $\frac{1}{2}$ to 5 minutes, at a temperature of, for example, 20° to 50° C., to achieve an impregnation of the gasket. The impregnated gasket is then removed from the bath and placed in a furnace where it is heated to polymerize, cross-link and harden the impregnating agent. After the impregnating agent has been hardened, the gasket is removed from the furnace and allowed to cool, generally to room temperature.

For some applications, in order to obtain a tight cylinder head gasket and provide a good seal, the asbestos fiber layer in the ready to be installed gasket must still be compressible after it is impregnated and accordingly, not all of the pores should be filled with the impregnating liquid.

Further, the saturating agent can be only partially polymerized in the cylinder head gasket to be installed, to insure compressibility. Complete polymerization then takes place after the gasket is installed. In this way it is possible for the gasket to plastically adapt itself to unevenness in the surfaces to be sealed. The partial polymerization can be controlled by additives and/or by regulating time, temperature and other reaction conditions of the polymerization. The partial polymerization should be conducted to a point where the liquid mass takes on a solid condition, but can still be plastically deformed.

Typical additives for controlling the polymerization include inhibitors and retarders such as amines. These inhibitors do not evaporate under the conditions of polymerization. When the gasket is installed in an engine, it is subjected to temperatures in the range of about 90° to 180° C. and at these temperatures the impregnating agent becomes completely polymerized.

If required, solids in dispersion may also be added to the impregnating liquid. These solids enrich the surface of the asbestos fibers during the impregnation process. Such substances as graphite or talcum may be used herein to counteract tackiness. Alternatively, these substances can be coated on the gasket after polymerization is completed. If desired, the impregnating agents used in the present invention can contain small quantities of fillers, extenders, or softeners, preferably with a high boiling point so that as these ingredients will not volatilize and cause undesirable pore formation and swelling.

The process of the present invention is advantageous in that the impregnating agent can penetrate through the perforations during the impregnating process until it reaches the bottom of the gasket and can disperse from there uniformly into all of the pores of the soft material, and fill in the pores to the desired degree.

In particular, this makes the impregnation of soft material sealing gaskets with embedded rough metal discs independent of the precision in manufacture of the rough metal plates, which can be accomplished only with difficulty and with large expenditures for tools. The impregnating agent can fill the free pores of the soft material wholly or in part. Moreover, the method of manufacture of the gaskets according to the invention is simple and economical since the perforating rolls can be placed without special problems after the calenders in which the soft material plates are united with the rough teeth metal plates. Practically no new process steps are thus required to produce the perforations.

According to the present invention, sealing gaskets can be produced which have quantities of impregnating agent that vary from place to place on the sealing surface of the gasket. To accomplish this, the perforation density is increased correspondingly in those areas where the impregnation is to be more dense.

The invention will now be described with reference to the drawings.

Figure 2:
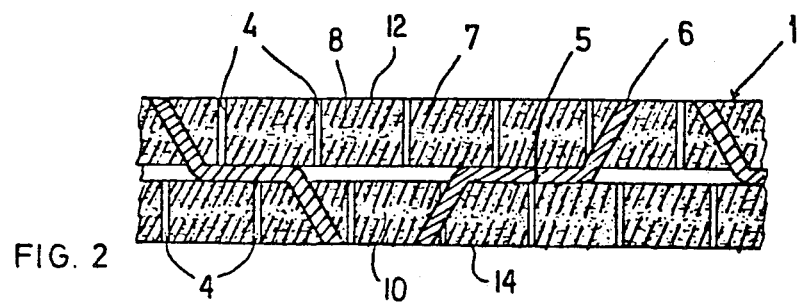
FIG. 2 is a cross-sectional view of a cylinder head gasket made in accordance with the present invention.

FIG. 1 is a top view of a gasket 1 having a flanged combustion chamber passage 2 and four oil passages 3. The sealing face of a gasket 1 is covered with a uniform network of punched-in perforations 4. In FIG. 2, in a cross-sectional view according to Section Line II—II, gasket 1 includes a first asbestos fiber web 8, a second asbestos fiber web 10 and an embedded metal plate 5 therebetween. Asbestos fiber web 8 has a sealing face 12 and asbestos fiber web 10 has a sealing face 14. Embedded metal plate has rough teeth 6 which extend to the sealing surfaces 12 and 14 of webs 8 and 10, respectively. Perforations 4 according to the invention, which have been punched in from both sides of gasket 1, that is, have been punched into webs 8 and 10, at regular intervals, pass through the entire thickness of gasket 1. In the subsequent impregnation, the impregnating agent, as indicated by hatching 7, has penetrated into gasket 1 from perforations 4 as well as from the tips 6 of the teeth 6 and has been uniformly distributed in the gasket.

It will be understood that the above description of the present invention is susceptible to various modifications, changes and adaptations, and the same are intended to be comprehended within the meaning and range of equivalents of the appended claims.

What is claimed is:

1. A porous soft material sealing gasket, comprising a soft material in the form of an asbestos fiber web having a sealing face and an impregnating agent, said asbestos fiber web containing free pores and a multiplicity of perforations in its unimpregnated form, and said impregnating agent filling at least a part of the free pores of the web by penetrating through the perforations during impregnation.

2. The gasket of claim 1 wherein the fiber web is metallically reinforced.

3. The gasket of claim 2 wherein the gasket is a cylinder head gasket for internal combustion engines.

4. The gasket of claim 1 wherein the perforations pass through the fiber web in a direction perpendicular to the sealing face of the web.

5. The gasket of claim 1 wherein the perforations are distributed over the surface of the sealing faces at uniform intervals.

6. The gasket of claim 1, 2, 3, 4, or 5, wherein the gasket contains two webs, each of which has a sealing face and a multiplicity of perforations, and approximately 3 to 15 perforations per square centimeter of sealing face are provided on each web.

7. The gasket of claim 1, 2, 3, 4, or 5, wherein the gasket has two sides, each of which has a sealing face, and approximately 3 to 15 perforations per square centimeter of sealing face are provided on each side of the gasket.

8. The gasket of claim 1, 2, 3, 4, or 5, wherein the perforation density per unit area of the web, is a function of the thickness of the web, said density increasing with increasing thickness of the web.

9. The gasket of claim 2 or 3 wherein the perforations are applied after the web has been reinforced with a metal plate.

10. The gasket of claim 1, 2, 3, 4, or 5, wherein the perforations each have a diameter of about 0.01 to about 0.1 mm.

11. The gasket of claim 1 wherein the impregnating agent is a plastic material.

12. The gasket of claim 1 wherein the impregnating agent is a material which is elastically cross-linked after impregnation.

13. The gasket of claim 1, 2, 3, 4 or 5, wherein, during said impregnation, the impregnating agent is in the form of an organic, synthetic, completely polymerizable liquid, which does not contain any volatile material.

* * * * *